(12) United States Patent
Benmohamed et al.

(10) Patent No.: US 6,400,684 B1
(45) Date of Patent: Jun. 4, 2002

(54) FLOW CONTROL METHOD USING A DYNAMIC MAJOR REDUCTION FACTOR

(75) Inventors: Lotfi Benmohamed, Freehold; Yung-Terng Wang, Marlboro; Wing Cheong Lau, Eatontown, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/145,351

(22) Filed: Sep. 1, 1998

(51) Int. Cl.[7] .............................................. H04L 12/26
(52) U.S. Cl. ................................ 370/230.1; 370/395.43
(58) Field of Search .................................. 370/229, 230, 370/230.1, 232, 236.1, 395.1, 395.21, 395.43, 468, 233, 234

(56) References Cited

U.S. PATENT DOCUMENTS 5,754,530 A * 5/1998 Awdeh et al. ............ 370/236.1
5,864,538 A * 1/1999 Chong et al. ............ 370/236.1
6,115,359 A * 9/2000 Depelteau et al. .......... 370/232
6,178,159 B1 * 1/2001 He et al. ..................... 370/234

OTHER PUBLICATIONS

Jiang et al., "Improved Consolidation Algorithms for Point-to-Multipoint ABR Service," Proceedings of IEEE ATM Workshop, pp. 195–205, (May 1998).
Chiussi et al., "Dynamic Max Rate Control Algorithm for Available Bit Rate Service in ATM Networks," IEEE Globecom '96, pp. 2108–2117.

Roberts, Lawrence G., "Point–to–Multipoint ABR Operation," ATM Forum/95–0834 (Aug. 7, 1995).
Roberts, Lawrence G., "Addition to TM Spec 4.0 on Point-to–Multipoint," ATM Forum/95–0339 (Apr. 10, 1995).
Bonomi et al., "ABR Point–to–Multipoint Connections," ATM Forum/95–0974(R1), pp. 1–4.
Awdeh et al., "Point–to–Mulitpoint Behavior of ABR," ATM Forum/95–0941 (Aug. 7–11, 1995), pp. 1–3.
Roberts, Larry, "Rate Based Algorithm for Point–to–Multipoint ABR Service," ATM Forum/94–0772(R1) (Nov. 10, 1994).
Hunt, Doug, "Open Issues for ABR Point–Multipoint Connections," ATM Forum/95–1034(Aug. 7–11, 1995).
The ATM Forum Technical Committee, "Traffic Management Specification," ATM Forum (Apr. 1996).
Fahmy et al., "Feedback Consolidation Algorithms for ABR Point–to–Multipoint Connections," ATM Forum/97–0615 (Jul. 1997).

* cited by examiner

Primary Examiner—Chau Nguyen
Assistant Examiner—D. Trinh
(74) Attorney, Agent, or Firm—Darby & Darby

(57) ABSTRACT

A flow control method for available bit rate service in an asynchronous transfer mode network for detecting congestion in a switch and conveying congestion status information using resource management cells to the source which adjusts its flow rate accordingly. During detection of congestion in the switch the explicit rate field of the resource management cell is updated using a dynamic major reduction factor to improve transient queue-length performance.

14 Claims, 2 Drawing Sheets

FLOW CONTROL METHOD USING A DYNAMIC MAJOR REDUCTION FACTOR

FIELD OF THE INVENTION

The present invention relates to a flow control method for an Available Bit Rate service in an Asynchronous Transfer Mode network. In particular, the invention is directed to a flow control method using a dynamic Major Reduction Factor (MRF), which is a non-increasing function of queue-length.

Asynchronous Transfer Mode (ATM) networks provide an Available Bit Rate (ABR) service in which the data rate is adjusted based on network congestion information. In the network, each switch employs an algorithm to detect and indicate congestion. One well-known control algorithm is referred to as the Dynamic Max Rate Control Algorithm (DMRCA), described by F. M. Chiussi et al., "Dynamic Max Rate Control Algorithm For Available Bit Rate Service in ATM Networks", IEEE Globecom '96, November 1996, and U.S. Pat. No. 5,701,292, which are herein incorporated by reference.

DMRCA flow control is implemented with an Explicit Rate Manager (ERM) to support ABR service and provide proper flow control in the ATM network. This is achieved by monitoring the queue-length at a congestion point of the switch and the maximum cell rate (MAX) of all connections arriving at the switch. Preferably, MAX is adjusted to smooth excessive oscillations in the maximum rate. The adjusted maximum rate Amax is defined as $$Amax = (1-alpha) \cdot Amax + alpha \cdot MAX$$

where alpha is an averaging factor, for example, $\frac{1}{16}$; and

MAX is the maximum cell rate of all connections arriving at the switch.

The DMRCA algorithm compares the queue-length q at a congestion point of the switch to a lower queue-length threshold QT and a higher queue-length threshold DQT. If the queue-length q at a congestion point is greater than or equal to DQT, the switch is considered to be "heavily congested" and the Explicit Rate (ER) field and Congestion Indication (CI) bit of the resource management (RM) cells which deliver the congestion information are marked accordingly. Specifically, the CI bit is set equal to "1" and the ER field of the RM cell is set equal to Amax·MRF, where MRF is the Major Reduction Factor. If the queue-length q at a congestion point is greater than or equal to QT but less than DQT, the switch is considered to be "moderately congested". In this moderately congested case, a marking threshold is set equal to Amax·Fn(q), where Fn( ) is a discrete, non-increasing correction function of the queue-length in the range $0 \leq Fn( ) \leq 1$, and the calculated marking threshold is compared to the current cell rate (CCR). If the current cell rate is greater than or equal to the marking threshold then the CI bit is set to "1".

The conventional DMRCA flow control algorithm often generates poor transient queue-length performance as a result of using a fixed MRF value to calculate and mark ER. Poor transient queue-length performance is caused by the fact that DMRCA does not explicitly measure bandwidth availability at the congestion point. Instead, DMRCA estimates the transmission rate of each ABR connection at the congestion point based on Amax, which, in turn, is computed based on CCR information carried by the forward resource management (FRM) cell. Since CCR is set by the ABR source when FRM cells depart its source, the CCR information will not change even when the bandwidth available (and thus the actual transmission rate of ABR connections) at the congestion point decreases drastically. In other words, when there is a sudden drop in available bandwidth at the congestion point, e.g., due to increase in high priority traffic, DMRCA will have the wrong information about actual bandwidth availability. Worse still, DMRCA will use the misleading Amax as the basis for major source rate reduction, i.e., ER is set to Amax·MRF. Since Amax is significantly higher than the actual fairshare of bandwidth an ABR connection should get after the onset of congestion, Amax·MRF is likely to remain higher than the fairshare because the value of MRF is statically set near to 1, e.g. $\frac{7}{8}$. As a result, the queue grows as it is filled with forward RM-cells carrying stale CCR information and the Amax values remain relatively large. The larger the queue becomes, the longer the Amax remains at high values. This positive feedback cycle continues indefinitely. In short, setting ER equal to Amax·MRF fails to reduce congestion. It is therefore desirable to develop a scheme to overcome these disadvantages.

SUMMARY OF THE INVENTION

The present invention is directed to a method for adjusting the flow rate of available bit rate connections in an asynchronous transfer mode network based on congestion information detected at a switch and conveyed using resource management cells having an explicit rate field. Upon an occurrence of an event, a determination is made of an estimated fairshare of bandwidth allotted to a particular connection at the switch. When a queue-length of the switch is greater than or equal to a queue-length threshold, the estimated fairshare of bandwidth allotted to the particular connection is then adjusted based on a dynamic major reduction factor, which is a non-increasing function of queue-length.

In a preferred embodiment, the maximum flow rate among all connections arriving at the switch is detected upon the arrival of an forward resource management cell at the switch and the detected maximum flow rate is adjusted based on a running exponential weighted average. A determination is made whether a queue-length of the switch is greater than or equal to a queue-length threshold. If the queue-length of the switch is greater than or equal to the queue-length threshold, then the explicit rate field of the resource management cell is marked based on a dynamic major reduction factor, which is a non-increasing function of queue-length.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawing, wherein like reference numerals denote similar elements throughout the several views.

DETAILED DESCRIPTION OF THE INVENTION

The present invention is directed to a flow control algorithm that uses a dynamic MRF in calculating the ER. It has been recognized that ABR source sending rates may be aggressively reduced when the queue-length grows beyond some normal level in order to prevent cell loss and improve transient queue-length performance by using a flow control algorithm that employs a dynamic MRF instead of a static value. In the extreme case, the ABR sources can be shut-down completely and then be allowed to gradually increase their rate from zero.

Figure 1:
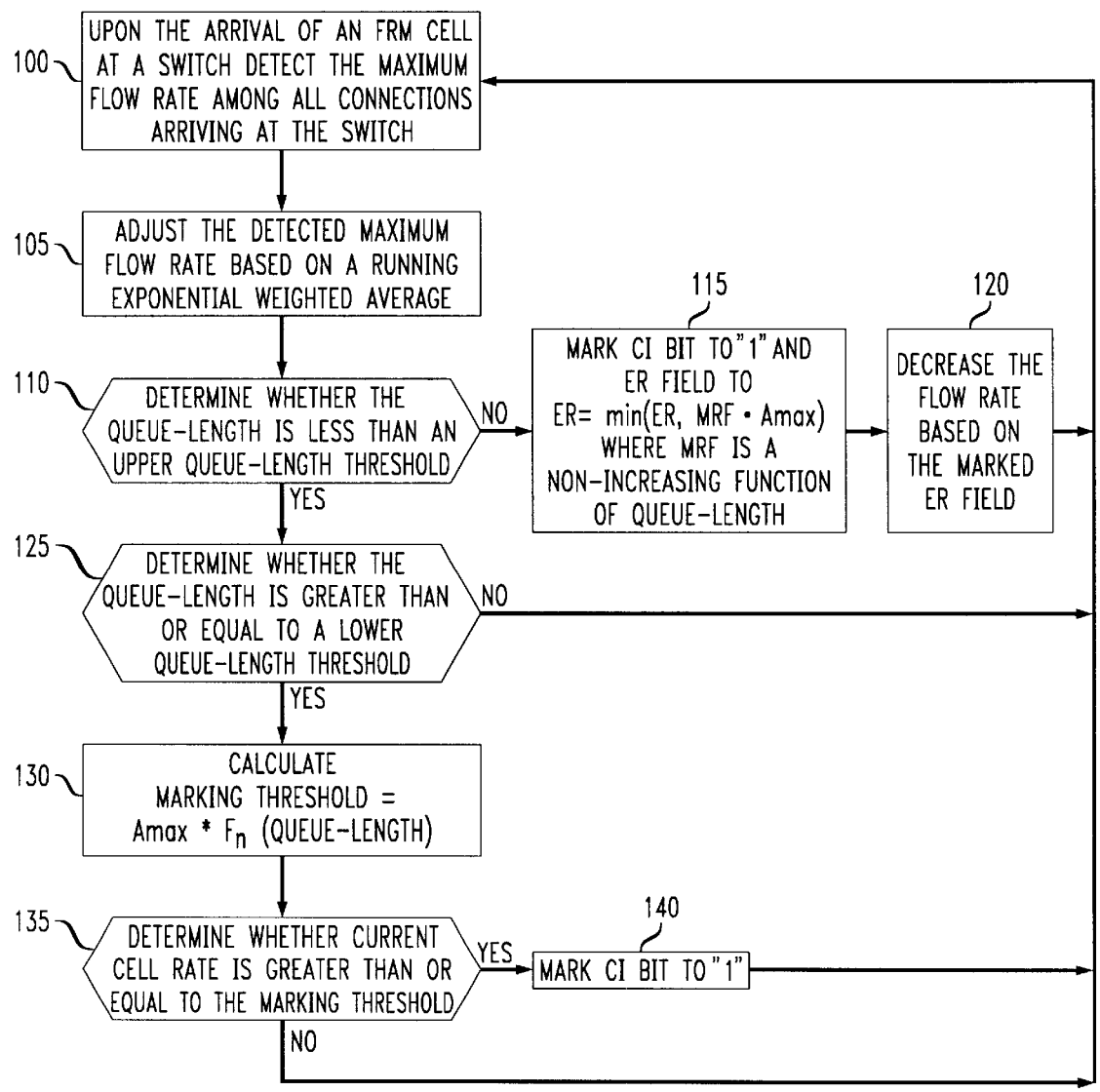
FIG. 1 is a flow chart of an example Dynamic Max Rate Control method using a dynamic major reduction factor in accordance with the present invention.

By way of example, the invention will be described for the conventional DMRCA algorithm described above. The inventive flow control method is performed the same way as the conventional DMRCA algorithm, except that when calculating the explicit rate (ER=Amax·MRF) instead of using a predetermined fixed MRF value, a dynamic MRF is employed. FIG. 1 is a flow chart of the dynamic max rate flow control method employing a dynamic major reduction factor, which is a non-increasing function of queue-length. Initially, a determination is made of an estimated fairshare of bandwidth allotted to a particular connection at the switch upon the occurrence of an event such as the arrival of an FRM cell at the switch or periodically after a predetermined period of time. Specifically, in step 100 the maximum flow rate among all connections arriving at the switch is detected upon the arrival of an FRM cell at the switch and the detected maximum flow rate is adjusted in step 105, preferably based on a running exponential weighted average. A determination is made in step 110 whether a queue-length of the switch is less than an upper queue-length threshold. If the queue-length of the switch is not less than the upper queue-length threshold, then in step 115 the CI bit is set to "1" and the explicit rate field of the resource management cell is marked as $$ER = \min(ER, MRF \cdot A\max)$$

where

MRF is a non-increasing function of queue-length; and

Amax is the adjusted maximum flow rate.

Thereafter, in step 120 the flow rate of the connection is decreased based on the marked explicit rate, and the process returns to step 100 and repeats. If at step 110 the queue-length of the switch is less than the upper queue-length threshold then in step 125 a determination is made whether the queue-length is less than a lower queue-length threshold. If the queue-length is greater than or equal to the lower queue-length threshold, then in step 130 the marking threshold is calculated as $$\text{Marking threshold} = A\max \cdot Fn(\text{queue-length})$$

where

Amax is the adjusted maximum flow rate; and

Fn(queue-length) is a discrete, non-increasing function of the queue-length.

Thereafter, in step 135 a determination is made whether the current cell rate (CCR) is greater than or equal to the marking threshold and, if it is, then the CI bit is set to "1" at step 140 and the process returns to step 100 and repeats. The modified DMRCA flow control method in accordance with the invention may be performed using a processor connected to the switch.

Figure 2:
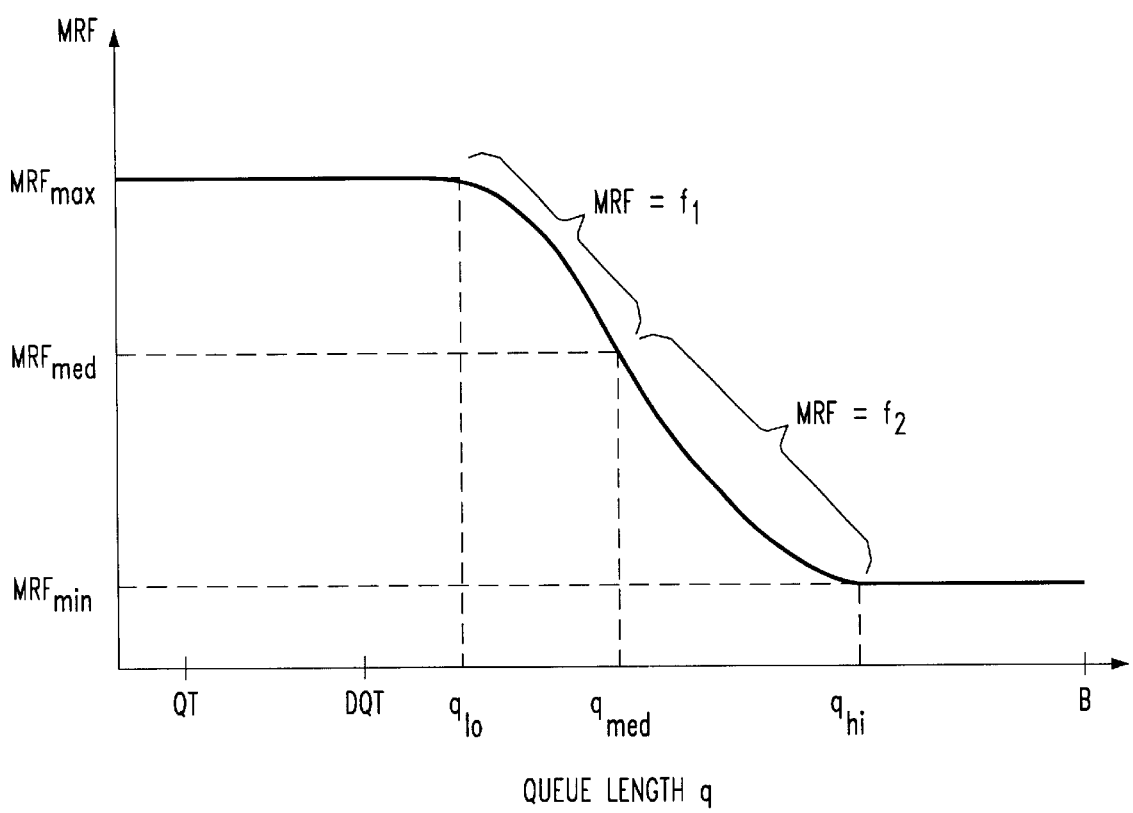
FIG. 2 is a graph of an example of a dynamic major reduction factor, which is a non-increasing function of queue-length.

FIG. 2 is an example of an MRF, which is a non-increasing function of queue-length. The y-axis represents the MRF value of which $MRF_{max}$, $MRF_{med}$, $MRF_{min}$ values are specified. The MRF-function is such that under normal situations, MRF remains constant at a value $MRF_{max} < 1$ (e.g. ⅞), as in the conventional DMRCA, and then drops rapidly as the queue grows beyond some high threshold to a final value of $MRF_{min} \geq 0$. Queue-length is indicated on the x-axis, and specifically the $q_{hi}$, $q_{med}$ and $q_{lo}$ queue-length values are identified, wherein $q_{lo} \geq DQT$ and $q_{hi}$ is defined as $$q_{hi} = B - (\alpha \cdot BW \cdot \tau)$$

where

B is the total buffer size;

α is a constant which differs for each network configuration;

BW is the link bandwidth; and

τ is the round-trip propagation delay between the source and the destination of an ABR connection.

Then MRF values are defined as $MRF = MRF_{max}$, for $0 \leq q \leq q_{lo}$;

$MRF = f_1(q, q_{lo}, q_{med}, MRF_{med}, MRF_{max}, k_1)$, for $q_{lo} < q < q_{med}$;

$MRF = MRF_{med}$, for $q = q_{med}$;

$MRF = f_2(q, q_{med}, q_{hi}, MRF_{min}, MRF_{med}, k_2)$, for $q_{med} < q < q_{hi}$;

$MRF = MRF_{min}$, for $q \geq q_{hi}$;

where $k_1$ and $k_2$ are constants.

Functions $f_1$ and $f_2$ may be any non-increasing function of queue-length such as:

1) an exponential convex function defined as $$f_{e\;convex}(x, x_{min}, x_{max}, y_{min}, y_{max}, k) = y_{min}, \text{ if } x \geq x_{max} = y_{max}, \text{ if } x \leq x_{min};$$

otherwise $$= y_{min} + (y_{max} - y_{min}) \exp[-k \cdot [(x - x_{min})/(x_{max} - x_{min})]]$$

where k is a constant.

2) an exponential concave function defined as $$f_{e\;concave}(x, x_{min}, x_{max}, y_{min}, y_{max}, k) = y_{min}, \text{ if } x \geq x_{max} = y_{max}, \text{ if } x \leq x_{min};$$

otherwise $$= y_{max} - (y_{max} - y_{min}) \exp[k \cdot [(x - x_{max})/(x_{max} - x_{min})]]$$

where k is a constant.

3) a quadratic convex function defined as $$f_{q\;convex}(x, x_{min}, x_{max}, y_{min}, y_{max}, k) = y_{min}, \text{ if } x \geq x_{max} = y_{max}, \text{ if } x \leq x_{min};$$

otherwise $$= y_{max} - (y_{max} - y_{min}) \cdot \sqrt{[1 - [(x_{max} - x)^2/(x_{max} - x_{min})^2]]}$$

4) a quadratic concave function defined as $$f_{q\;convex}(x, x_{min}, x_{max}, y_{min}, y_{max}, k) = y_{min}, \text{ if } x \geq x_{max} = y_{max}, \text{ if } x \leq x_{min};$$

otherwise $$=y_{min}+(y_{max}-y_{min})\cdot\sqrt{[1-[(x-x_{min})^2/(x_{max}-x_{min})^2]]};$$

or 5) a linear function defined as $$f_{linear}(x, x_{min}, x_{max}, y_{min}, y_{max}, k)=y_{min}, \text{ if } x \geq x_{max}=y_{max}, \text{ if } x \leq x_{min};$$

otherwise $$=y_{min}+[(y_{max}-y_{min})/(x_{max}-x_{min})]\cdot(x_{max}-x)$$

In a preferred embodiment the dynamic MRF values are stored in a look-up-table (LUT).

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those method steps which perform substantially the same function in substantially the same way to achieve the same results are within the scope of the invention. Substitutions of steps from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for adjusting a flow rate in an asynchronous transfer mode network based on congestion information detected at a switch and conveyed using resource management cells having an explicit rate field, said method comprising the steps of:

determining upon an occurrence of an event an estimated fairshare of bandwidth allotted a particular connection at the switch, said determining step comprising the steps of:

detecting a maximum flow rate among all connections arriving at the switch upon arrival of a forward resource management cell at the switch; and adjusting the detected maximum flow rate based on a running exponential weighted average; and when a queue-length of the switch is greater than or equal to a queue-length threshold, adjusting the estimated fairshare of bandwidth allotted to the particular connection based on a dynamic major reduction factor, said dynamic major reduction factor being a non-increasing function of queue-length.

2. A method in accordance with claim 1, wherein said determining step comprises the step of defining the event based on arrival of a forward resource management cell at the switch.

3. A method in accordance with claim 1, wherein said determining step comprises the step of defining the event as a predetermined period of time.

4. A method for adjusting a flow rate in an asynchronous transfer mode network based on congestion information detected at a switch and conveyed using resource management cells having an explicit rate field, said method comprising the steps of:

determining upon an occurrence of an event an estimated fairshare of bandwidth allotted a particular connection at the switch; and when a queue-length of the switch is greater than or equal to a queue-length threshold, adjusting the estimated fairshare of bandwidth allotted to the particular connection based on a dynamic major reduction factor, said dynamic major reduction factor being a non-increasing function of queue-length, said adjusting step comprising the step of calculating the explicit rate field as $$ER=\min(ER, MRF\cdot A\max)$$

where

MRF is a non-increasing function of queue-length; and

Amax is the adjusted maximum flow rate.

5. A method for adjusting a flow rate in an asynchronous transfer mode network based on congestion information detected at a switch and conveyed using resource management cells having an explicit rate field, said method comprising the steps of:

determining upon an occurrence of an event an estimated fairshare of bandwidth allotted a particular connection at the switch; and when a queue-length of the switch is greater than or equal to a queue-length threshold, adjusting the estimated fairshare of bandwidth allotted to the particular connection based on a dynamic major reduction factor, said dynamic major reduction factor being a non-increasing function of queue-length, said adjusting step comprising the step of defining the major reduction factor function to include a maximum major reduction factor value less than or equal to "1" and a minimum major reduction factor value greater or equal to "0".

6. A method in accordance with claim 5, wherein said adjusting step comprises the step of defining the major reduction factor function so that the minimum major reduction factor value corresponds to a maximum queue-length value defined as $$q_{hi}=B-(\alpha\cdot BW\cdot\tau)$$

where

B is total buffer size;

$\alpha$ is a constant which differs for each network configuration;

BW is link bandwidth; and $\tau$ is a round-trip propagation delay between a source and a destination of an available bit rate connection.

7. A method in accordance with claim 6, wherein said adjusting step comprises the step of defining the major reduction factor function as MRF=$MRF_{max}$, for $0 \leq q \leq q_{lo}$;

MRF=$f_1(q, q_{lo}, q_{med}, MRF_{med}, MRF_{max}, k_1)$, for $q_{lo}<q<q_{med}$;

MRF=$MRF_{med}$, for $q=q_{med}$;

MRF=$f_2(q, q_{med}, q_{hi}, MRF_{min}, MRF_{med}, k_2)$, for $q_{med}<q<q_{hi}$;

MRF=$MRF_{min}$, for $q \geq q_{hi}$;

where $MRF_{max}$ is the maximum major reduction factor value;

$MRF_{min}$ is the minimum major reduction factor value;

$MRF_{med}$ is an intermediate major reduction factor value, where $MRF_{min}<MRF_{med}<MRF_{max}$;

q is the queue-length;

$q_{hi}$ is the maximum queue-length;

$q_{lo}$ is a minimum queue-length;

$q_{med}$ is an intermediate queue-length, where $q_{lo} < q_{med} < q_{hi}$;

$f_1$ and $f_2$ are first and second non-increasing functions of queue-length; and $k_1$ and $k_2$ are constants.

8. A method in accordance with claim 7, wherein said adjusting step further comprises selecting the first and second non-increasing functions from the group consisting of an exponential concave function, an exponential convex function, a quadratic concave function, a quadratic convex function, and a linear function.

9. A method in accordance with claim 7, wherein the first and second non-increasing functions are the same function.

10. A method in accordance with claim 8, wherein said adjusting step comprises the step of defining at least one of the first and second non-increasing functions as the exponential convex function defined as $$f_{e\ convex}(x, x_{min}, x_{max}, y_{min}, y_{max}, k) = y_{min}, \text{ if } x \geq x_{max} = y_{max}, \text{ if } x \leq x_{min};$$

otherwise $$= y_{min} + (y_{max} - y_{min}) \exp[-k \cdot [(x - x_{min})/(x_{max} - x_{min})]]$$

where k is a constant.

11. A method in accordance with claim 8, wherein said adjusting step comprises the step of defining at least one of the first and second non-increasing functions as the exponential concave function defined as $$f_{e\ concave}(x, x_{min}, x_{max}, y_{min}, y_{max}, k) = y_{min}, \text{ if } x \geq x_{max} = y_{max}, \text{ if } x \leq x_{min};$$

otherwise $$= y_{max} - [(y_{max} - y_{min}) \exp[k \cdot [(x - x_{max})/(x_{max} - x_{min})]]]$$

where k is a constant.

12. A method in accordance with claim 8, wherein adjusting step comprises defining at least one of the first and second non-increasing functions as the quadratic convex function defined as $$f_{q\ convex}(x, x_{min}, x_{max}, y_{min}, y_{max}, k) = y_{min}, \text{ if } x \geq x_{max} = y_{max}, \text{ if } x \leq x_{min};$$

otherwise $$= y_{max} - (y_{max} - y_{min}) \cdot \sqrt{[1 - [(x_{max} - x)^2/(x_{max} - x_{min})^2]]}.$$

13. A method in accordance with claim 8, wherein said adjusting step comprises the step of defining at least one of the first and second non-increasing functions as the quadratic concave function defined as $$f_{q\ concave}(x, x_{min}, x_{max}, y_{min}, y_{max}, k) = y_{min}, \text{ if } x \geq x_{max} = y_{max}, \text{ if } x \leq x_{min};$$

otherwise $$= y_{min} + (y_{max} - y_{min}) \cdot \sqrt{[1 - [(x - x_{min})^2/(x_{max} - x_{min})^2]]}.$$

14. A method in accordance with claim 8, wherein said adjusting step comprises the step of defining at least one of the first and second non-increasing functions as the linear function defined as $$f_{linear}(x, x_{min}, x_{max}, y_{min}, y_{max}, k) = y_{min}, \text{ if } x \geq x_{max} = y_{max}, \text{ if } x \leq x_{min};$$

otherwise $$= y_{min} + [(y_{max} - y_{min})/(x_{max} - x_{min})] \cdot (x_{max} - x).$$

\* \* \* \* \*